United States Patent [19]

Brigliadoro et al.

[11] 4,127,081

[45] Nov. 28, 1978

[54] JET RESONATOR PULSATOR

[75] Inventors: George Brigliadoro, Wanaque, N.J.; Herman H. Feller, Valley Stream, N.Y.

[73] Assignee: Rodex International, Ltd., Valley Stream, N.Y.

[21] Appl. No.: 536,386

[22] Filed: Dec. 26, 1974

[51] Int. Cl.$^2$ .............................................. G08B 13/00
[52] U.S. Cl. .............................. 116/22 A; 116/137 A
[58] Field of Search ......................... 116/22 A, 137 A; 137/559, 533.11, 829, 830, 831; 340/406

[56] References Cited

U.S. PATENT DOCUMENTS

| | | | |
|---|---|---|---|
| 1,811,381 | 6/1931 | Berwick | 137/533.11 X |
| 2,103,427 | 12/1937 | Long | 137/533.11 X |
| 2,334,552 | 11/1943 | Hammond, Jr. | 340/406 X |
| 2,922,999 | 1/1960 | Carlin | 116/22 A |
| 2,941,542 | 6/1960 | Jacobson | 137/531.11 X |
| 3,035,575 | 5/1962 | Broman | 137/559 X |
| 3,174,437 | 3/1965 | Street | 137/533.11 X |
| 3,188,999 | 6/1965 | Baxter | 116/137 A |
| 3,465,784 | 9/1969 | Cofoid | 137/533.11 X |

*Primary Examiner*—Daniel M. Yasich

*Attorney, Agent, or Firm*—Schwartz & Weinrieb

[57] ABSTRACT

A pulsator for a jet resonator finding particular value and utility in rodent control while maintaining and achieving improved effectiveness together with built-in safe guards against accidental detrimental or fatal effects of ultrasonic sound on human beings while maintaining a low cost of parts and production thereby making improved pest control available to the broad populous, the pulsator including an elongated upright tube having a jet in a lower-end opening and having a ball-receiving seat structure circumscribing and as a part of the upper outlet opening, with a metal ball of smaller size than the cross-section of the elongated space defined in the tube such that the ball is tossed reciprocatingly upwardly in the tube without unduly limiting fluid stream when the ball is tossed upwardly but retarding the flow of the stream as the ball falls downwardly toward the open nozzle end of the lower-end jet which nozzle preferably projects upwardly into the space for a minor distance, pressure of the stream of at least about 60 pounds serving to cause the ball to be locked into the outlet seat structure totally blocking the fluid stream until pressure is reduced to below that value.

10 Claims, 4 Drawing Figures

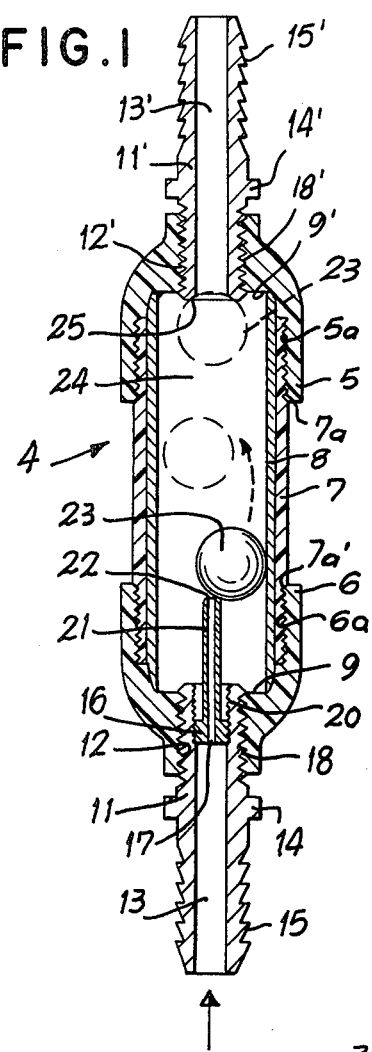
FIG.1
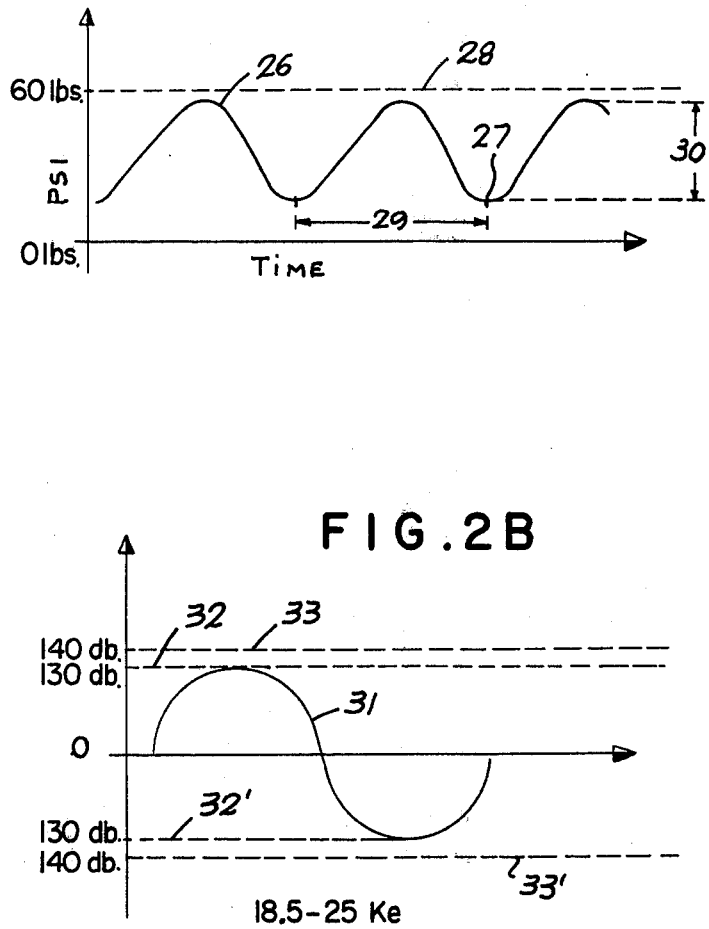
FIG.2A
FIG.2B
18.5-25 Kc
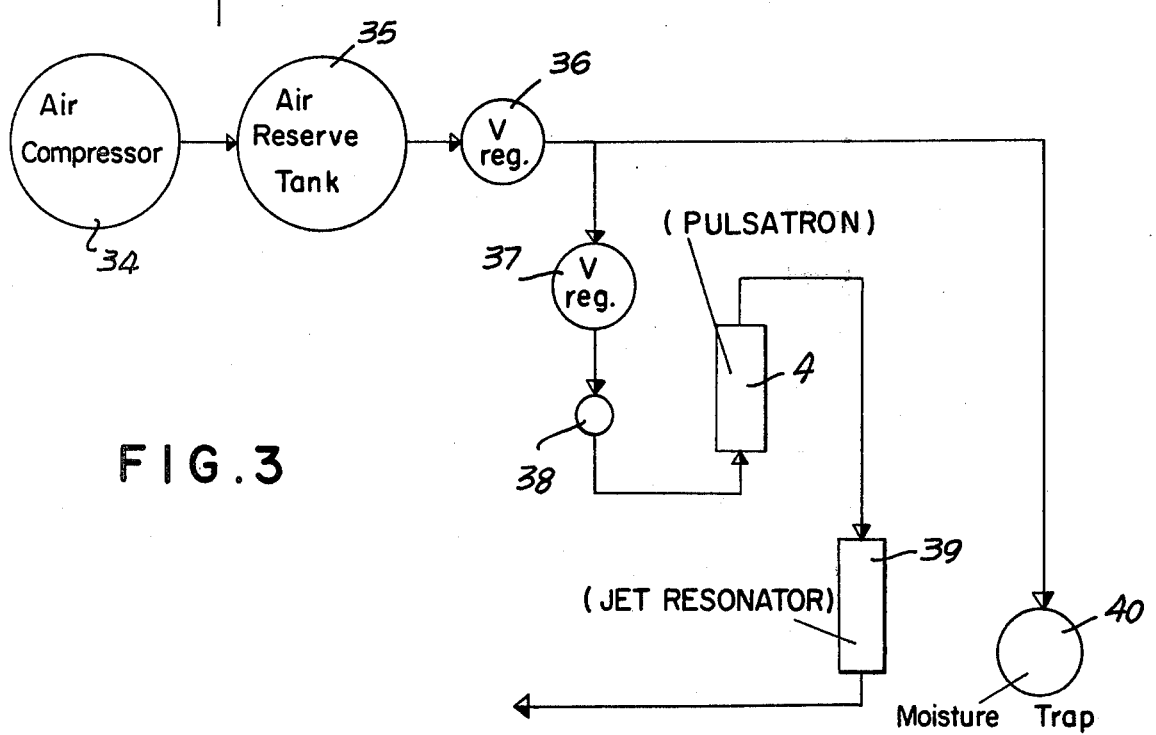
FIG.3

JET RESONATOR PULSATOR

This invention relates to a novel and improved pulsator and a novel use thereof in a jet resonator such as for pest control by ultrasonic sound.

BACKGROUND TO THE INVENTION

Prior to the present invention there have existed various devices which are operated by pressurized fluid-flow streams such as fluid-streams driven motors and such as pest-control jet resonators, merely as typical examples, in which excessive pressure accidentally may injure the motor by bringing about excessive uncontrolled speeds as well as the blowing of gaskets or the like, which also possibly injuring other equipement or persons for which the fluid-driven motor is utilized in that particular instance. Similarly, the excess fluid pressure even momentarily in a jet resonator can exceed tolerances of the equipement, but more importantly with ultrasonic jet resonators utilized in pest control, air or other fluid pressure exceeding 60 pounds can cause ultrasonic sound detrimental to the human ear and even can be fatal to human being in bringing about death while being in a pitch beyond the detection by the human ear in so far as the human being being conscious of the presence of the sound, thereby increasing the potential danger of such resonators to human beings. Additionally, within normal operation of jet resonators for producing ultrasonic sound for pest control, there have existed certain problems.

One problem with regard to the effectiveness of such pest control systems arises from the fact that the control effected in pests such as in rodent control—typically of rats, is that the effectiveness is intended to result from the sound being irritating and bothersome to the rats, which rats thereby, it is hoped, abandon their abode for more pleasant surroundings. As a matter of fact, however, it has been found that the rats are very adaptable to such nuisance sound, adjusting themselve to tolerate and continue to thrive in the presence of such sound.

Also, in order for a jet resonator to produce harmonics, the input air flow must be pulsating. The air source used on typical first jet resonators for a single system was a diaphragm or a piston type compressor. The output of the above-type of compressors were fed directly into the input of the jet resonator without an air reserve tank. The output pressure of these compressors were between 12 and 20 pounds per square inch; for multiple installations it was necessary to use a much larger air compressor to produce a higher air pressure into a reserve tank. The purpose of this was so that many jet resonators could be fed by one central system, each jet resonator being tapped off of a main air line at 100 pound per square inch pressure with a regulator to cut the pressure down to between 12 to 20 p.s.i. pressure. It was noted that the sign wave output of the jet resonator at 20 KHZ was not producing enough harmonics to be effective for the application. While using a single compressor feeding the jet resonator without an air reserve tank, the pulsating of the piston or diaphragm was felt in the resonant cavity of the jet resonator producing a steady air flow, cutting down the amount of harmonics generated.

A typical prior art jet resonator of the type to which the present invention is adaptable, or utilizable with, is disclosed in the U.S. Pat. No. 3,188,999 patented June 15, 1965 to Baxter. However, the present invention is not limited to that particularly disclosed system, as shall be apparent from the preceding and following disclosure.

SUMMARY OF THE INVENTION

One or more objects of the present invention include the overcoming and/or avoiding of problems and difficulties of the type discussed above.

Another object of the present invention is to obtain a pulsator of low cost and efficient operation and simple parts and construction and operation, avoiding costly maintenance thereof and being of sturdy, reliable and long-lasting proper functioning.

Another object is to obtain a pulsator which when used in a pest-control such as for rats, jet ultrasonic resonator, there is produceable thereby a continuously and continually changing harmonics which creates a changing environment of the ultrasonic sound generated thereby to cause confusion to rodents or other frustrations leading the rodents to abandon any effort to adjust and leading the rodents thereby to abandon their abode.

Other object of the invention become apparent from the preceding and following disclosure.

One or more objects of the present invention are obtained by the invention as defined herein.

Broadly the invention includes a novel effective low cost pulsator operable in a fluid-flow stream and of simple durable and effective construction and installation while offering benefits not heretofore available at least to the improved extent inherent in the present pulsator, which in its broadest terms is an upright elongated tubular enclosure structure having a narrowed inlet preferably centrally located lower opening and thereabove an upper preferably about centrally located upper opening which upper opening preferably includes a seating structure receivable of a ball such that when the ball is seated the upper outlet opening is thereby sealed closed to further flow of the fluid stream, and there preferably being mounted within the lower open sealed therearound a jet nozzle projecting upwardly a minor predetermined distance into the space between the lower and upper openings through which nozzle there is fed the incoming fluid jet stream such as, preferably, compressed air under pressure, and there being within the space defined within the tubular element a ball of smaller cross-section than the cross-section of the space of the tubular element but the ball being about slightly larger than at least half the diameter of the space adjacent the fluid-ejecting tip of the nozzle end pointed upwardly within the enclosed space, such that the fluid pressure continually tosses upwardly the preferably metal ball into the space, and such that the tossing thereof and falling back thereof modulates the air stream passing through the chamber space, the space being free of obstructions other than the tossable ball of predetermined mass. This device makes possible the modifying of the air flow into the jet resonator to be a pulsating stream pulsating directly proportional to the speed of the oscillating or reciprocating ball as it is tossed upwardly and falls downwardly from the toss, thusly causing pulsating interruptions in the tuned resonant cavity of the resonator which in turn produces an end result of harmonic generation; the interuption caused by the pulsating ball modulates the output carrier sign wave of the ultrasonic generator in direct proportion to the speed of the oscillating ball in the pulsator of this invention, which rate of pulsation is dependent largely upon the shape, size and mass of the ball together with the pressure of the fluid streams and the size of the orifice of the nozzle within the chamber enclosed space of the pulsator. The preferred embodiment pulsator of this invention having specific preferred dimensions will typically operate between about 10 and 40 pounds per square inch (psi) of fluid pressure. However, smaller and larger pulsatrons for the application are directly proportional to the amount of air desired.

The harmonic content is necessary in the application of detering rodents. The harmonics generatied on the carrier sign wave tuned to between 18.5 KHZ and 21.5 KHZ up to 130 Decibels have the resultant effect of the cumulative harmonics creating a changing environment of the ultrasonic sound generated thereby causing confusion to the rodents as to where the source of the sound is coming from, or other frustrations. Due to parabolic reflection and the harmonic content of the signwave output of the ultrasonic generator, this causes a screeching distorted sound and changing pitches through the combination of the harmonics generated on the carrier frequency. The end result of harmonics generated on the carrier frequency and parabolic reflection causes a beat frequency oscillation producing modulated frequences of the carrier sign wave, which causes a frequency band based on harmonic content which in turn is a continuously changing sound environment creating a multitude of sound disturbances at a high decibel rate. Therefore, the changing environmental sound produced will not enable a rodent to define its direction or its source, and will inherently have other frustrating effects on the rodents. Thus, a rodent cannot and it has been discovered does not build up an immunity to its sound because of the multitude of the changing effects.

It should be noted that decibels in excess of about 140 are dangerous to the human ear and to the human himself, at greater than about 18.5 kilocycles of ultrasonic sound and that the pulsator of the present invention in a preferred embodiment thereof obtains about 18.5 to about 25 Ke at about 110 to about 130 decibels, with the safety pulsator limiting passage of the fluid steam such as compressed air, at a pressure greater than about 60 pounds per square inch, in excess of which is is possible that the ultrasonic sound could exceed 18.5 on occasions when accidentally excessive pressures are produces, such as for example might occur if and when a pressure-cutting (pressure-reducing) regulator fails because of deterioration or other malfunction such that a higher tapped line pressure surges through the pulsator. With the present pulsator in a preferred embodiment thereof, the upper opening receives the ball in a seated fashion that blocks the outlet, the excessive pressure causing the ball to be tossed into the seat and to be held there by the excessive pressure totally overcoming the gravitaional pull on the predetermined mass of the ball.

THE FIGURES

FIG. 1 illustrates in side cross-sectional view a typical and preferrend pulsator of the present invention, in the upright position in which it must be mounted for proper functioning and operation.

FIG. 2 is a graphic diagrammatic representation of the typical pulsations in the flow of the air or other fluid stream from the upper exit opening of the pulsator of the present invention, approaching but typically not reaching zero flow as the ball drops back (downwardly) after being tossed upwardly through consecutive cycles of continually being tossed upwardly by the incoming jet stream ejected upwardly from the nozzle end mounted pointed upwardly from the lower opening in which the nozzle is sealably mounted, the curve representing a continuing operation of the pulsator over a predetermined period of time, the exact time calibrations depending upon the magnitude of the fluid stream pressure, the size of the orifice of the nozzle, the mass and size of the ball and the like.

FIG. 3 illustrates graphically a diagram of an ultrasonic resonator incorporating as a combination, the jet resonator pulsator of the present invention, resulting in an improved combination.

FIG. 2B illustrates the typical decibels sine wave and the magnitude of decibels obtained by the pulsator of the present invention at typically 18.5 to 25 Ke, as obtained by the pulsations represented in FIG. 2.

DETAILED DESCRIPTION OF THE INVENTION

In reference in FIGS. 1, 2A, 2B, and 3, the following description of a preferred embodiment and combination will serve to facilitate better understanding of the nature of the invention.

In FIG. 1, there is disclosed in typical cross-section a preferred embodiment in side view of the pulsator in an operatively upright state, identified as pulsator 4. The pulsator 4 includes typically and preferably upper mounting shell 5 and lower mounting shell 6 having female threads 5a and 6a respectively, into which thread cylindrical tubular member 7 with its male threads 7a and 7a' mountedly screw to form a total enclosure defining space 24, the elements 5 and 6 and 7 typically being low cost plastic while the enclosed cylindrical tubular member 8 is typically metal and rests at on flattened surfaces 9 and 9' at opposite ends thereof, and the shells 5 and 6 respectively having openings 18' and 18 therein centrally located in each, having metal inlet tube mount 11 screwed into the opening 18 and the metal outlet tube mount 11' screwed into the outlet opening 18' by the male threads 12 and 12' thereof respectively, each tubular mount 11 and 11' having a through passage 13 and 13' respectively for the channeling of the fluid stream to and from the space 24, and each tube mount 11 and 11' having a nut-configuration 14 for facilitating the use of a wrench therewith to screw in and out the respective tube mount 11 and 11' into the threaded openings 18 and 18' respectively, and the distal end portions externally of the tube mounts 11 and 11' having the irregular surfaces 15 and 15 respectively for anchoring onto the mounts 11 and 11' the tubes to be forced onto them respectively. At the proximal upper end of the mount 11 within the enclosed space 24 is the internally female-threaded end having threads 20 with which mesh male threads of insert nozzle member 16 having central channel (through-space) 17 opening at the nozzle upper outlet end 22 of the nozzle 21 projecting into the space 24 upwardly toward opening 18'. Loosely enclosed within the unobstructed space 24 is metal ball 23 of a spherical shape and having a diameter such that in the illustrated lower-resting state in contact with the nozzle, the mass of the ball extends over the nozzle opening 22 such that fluid stream ejected from the nozzle opening 22 impacts upon the ball surface of ball 23 to toss it upwardly in an oscillating and cyclically reciprocating fashion, but such that the ball in this preferred embodiment does not at any time totally block the flow of the pressurized air coming from the opening 22, and the upper tube mount 11' having at its lower opening end a seat-shape 25 receivable of the ball 23 such that upon excessive pressure of the fluid stream the ball 23 becomes pressed into the seat 25 to thereby block further outlet flow of the stream until the fluid pressure becomes diminished sufficiently for the ball 23 to drop downwardly toward the jet 21 opening 22.

FIG. 2A illustrates merely graphically over a predetermined time period which could be varied, dependent upon factors already noted above, the above related pulsator structure resulting in fluid pressure flow out of the channel 13' at always values greater than zero, and during normal operation less than the safety-locking pressure of typically 60 psi discussed already above. The peak 26 results when the ball is at the height of the toss or oscillation, while the low point results when the ball 23 drops to a partially blocking position of the jet stream from the opening 22, the level 60 psi being indicated at 28. The distance in terms of time at 29 and the height of the toss as measured between the upper and lower extremes of pressure at 30 are dependent upon the mass of the ball, the size of the ball, the diameter of the cross-section of space 24 at different heights above the nozzle opening 22, the size of the nozzle opening 22, the shape and texture of the ball 22, and the like.

FIG. 2B illustrates a typical sine curve resulting from the resonator combination of the ultrasonic device of this invention, including the curve 31, the upper and lower resulting decibel levels 32 and 32' and the maximum decibels as limited by the inventive pulsator, at 33 and 33' as the 140 decibels.

FIG. 3 illustrates the ultrasonic preferred combination including the air compressor 34, the air pressure tank 35, the main air regulator 36 set at about 100 psi, the regulator 37, the guage set at about 12 to 20 psi at 38, the novel pulsator 4, and jet resonator 39, and a moisture trap 40.

In a preferred typical embodiment, the ball diameter is 0.375 in. weighing (mass) 3.53 grams with the cross-section of space 24 being from about 0.623 to 0.628 in. to thereby give a difference between ball diameter and cross-section space diameter across the tube 8 of about 0.248 inches and an air jet nozzle outlet diameter of about 0.076 inches. Other dimensions are not nearly so important to a preferred embodiment.

It is within the scope and spirit of the present invention to make such variations, modifications, substitution of equivalent elements, and the like as would be apparent to a person of ordinary skill in this particular art.

We claim:

1. In a device for producing sound vibrations of a frequency effective to repel pests comprising a jet resonator and a pulsator device in a serially fluidic relationship with said jet resonator and wherein said device produces intermittent ultrasonic sound waves, said pulsator device comprising in combination: structure means defining a total enclosure having upper and lower openings defined therein, a nozzle projecting a fluid stream upwardly from said lower opening and spaced from the walls of said enclosure, an element substantially loosely located within said enclosure, said enclosure being substantially free of other obstructions between said upper and lower openings and said enclosure being shaped such that the space circumscribingly adjacent each of said upper and lower openings and the space extending between the upper and lower openings being of greater cross-section than said element, said element having a cross-section greater than one-half of said enclosure and being of predetermined mass such that when said fluid is directed onto the mass of said element causing said element to drop downwardly after being tossed upwardly by the fluid stream from said nozzle thereby producing said pulsating fluid stream exiting through the upper opening, whereby an excessive fluid pressure in said enclosure space will cause said element to temporarily sealingly engage said upper opening.

2. The pulsator device of claim 1, including a nozzle mounted within said lower opening and projecting upwardly into said enclosure space between the upper and lower openings, the nozzle being sealedly mounted within said enclosure structure such that fluid is flowable upwardly through said nozzle.

3. The device of claim 2 wherein said element is spherical in shape.

4. The pulsator device of claim 3, in which said enclosure structure means at and circumscribing said upper opening defines a concavely shaped seat seatable of said spherically shaped element.

5. The pulsator device of claim 4, in which said enclosure structure defining said space between said upper and lower openings is such that the space extending between the upper and lower openings is substantially columnar in shape.

6. The pulsator device of claim 5, in which said spherical element is a metal ball.

7. The pulsator device of claim 1, in which said element is a metal ball.

8. The pulsator device of claim 1, in which said enclosure structure means at and circumscribing said upper opening defines a concavely shaped seat seatable of said element.

9. The pulsator device of claim 1, in which said enclosure structure defining said space between said upper and lower openings is such that the space extending between the upper and lower openings is substantially columnar in shape.

10. The pulsator device of claim 1, further comprising a jet resonator means in a serially fluidic relationship with said pulsator and wherein said predetermined mass is such that a fluid stream pressure greater than 60 pounds per square inch pressure-locks said element sealably into said upper opening thereby preventing dangerous ultrasonic sound for humans.

* * * * *